United States Patent
Matsuhashi et al.

(10) Patent No.: US 6,233,603 B1
(45) Date of Patent: May 15, 2001

(54) PLAY DEVICE FOR GENERATING AND ELECTRONICALLY EXCHANGING SYNTHESIZED SELF-PORTRAIT

(75) Inventors: Hisahiro Matsuhashi; Hideki Sugimoto, both of Osaka (JP)

(73) Assignee: Fumai Electric Co., Ltd., Daito (JP)

( * ) Notice: Subject to any disclaimer, the term of this patent is extended or adjusted under 35 U.S.C. 154(b) by 0 days.

(21) Appl. No.: 09/176,945

(22) Filed: Oct. 22, 1998

(30) Foreign Application Priority Data

Oct. 23, 1997 (JP) .................................................. 9-009411

(51) Int. Cl.[7] ...................................................... G06F 13/00
(52) U.S. Cl. ......................... 709/203; 709/204; 709/219; 709/313
(58) Field of Search .................................. 709/203, 217, 709/219, 250, 313, 328, 329, 204, 205, 206; 396/2

(56) References Cited

U.S. PATENT DOCUMENTS

| | | | |
|---|---|---|---|
| 5,367,522 | * 11/1994 | Otani | ..................................... 370/468 |
| 5,491,743 | * 2/1996 | Shiio et al. | ........................... 709/204 |
| 5,621,492 | * 4/1997 | Beveridge et al. | ....................... 396/2 |
| 5,689,299 | * 11/1997 | Isono et al. | ............................... 348/7 |
| 5,793,365 | * 8/1998 | Tang et al. | ............................ 345/329 |
| 5,953,504 | * 9/1999 | Sokal et al. | ........................ 379/91.01 |
| 6,014,689 | * 1/2000 | Budge et al. | ......................... 709/206 |

FOREIGN PATENT DOCUMENTS

| | | |
|---|---|---|
| 5-233308 | 9/1993 | (JP) . |
| 6-251114 | 9/1994 | (JP) . |
| 3014733 | 6/1995 | (JP) . |
| 8-280934 | 10/1996 | (JP) . |

* cited by examiner

*Primary Examiner*—Viet D. Vu
(74) *Attorney, Agent, or Firm*—Morgan, Lewis & Bockius LLP

(57) ABSTRACT

A play device for generating a synthesized self-portrait which includes a photographed image of a player and frame is disclosed in the present invention. The device includes a terminal for displaying and printing the synthesized self-portrait, a network server for providing the self-portrait data of each player assigned to ID code data at designated terminals, a management device for managing the play device, and a monitoring system for monitoring various operation conditions of the play device.

5 Claims, 4 Drawing Sheets

PLAY DEVICE FOR GENERATING AND ELECTRONICALLY EXCHANGING SYNTHESIZED SELF-PORTRAIT

This application claims the benefit of Japanese utility model patent application No. Hei. 9-9411, filed Oct. 23, 1997, which is hereby incorporated by reference.

BACKGROUND OF THE INVENTION

1. Field of the Invention

The present invention relates to a play device for generating a synthesized self-portrait, and more particularly, to a play device for generating a synthesized self-portrait by synthesizing a self-portrait photographed by a player with a selected background frame image. Although the present invention is suitable for a wide scope of applications, it is particularly suitable for electronically exchanging the synthesized self-portrait with the other players through the Internet, so that the exchanged self-portrait is printed at a desired terminal of the play device.

2. Description of the Related Art

An example of a type play device for generating a synthesized self-portrait is disclosed in Japanese Utility Model Registered Publication No. 3014733. The play device for generating a synthesized self-portrait begins to operate when a coin is put into the device. The first process for generating a synthesized self-portrait is to photograph a desired object with a camera attached in a terminal. An obtained image and a selected background frame image from previously prepared frame images are synthesized, so that a self-portrait is completed and is displayed on a display device such as CRT. The synthesized self-portrait is then printed on a seal by a video printer. This type of function is referred to herein as a stand-alone type play in this specification.

Further, it has been also proposed a play device capable of generating a home page including a self-portrait and voice through the Internet. After the home page is registered in the Internet through the public telephone line, the self-portrait on the home page is printed on a seal. This type of function is referred to as a network type play, and a terminal of the play device is referred to herein as a network type play device.

In this type terminal of a play device, a background image is selected from the previously prepared frame images when a self-portrait is synthesized. Conventionally, the printed self-portraits on seals are personally exchanged with each other as desired. However, the players always desire more entertaining ways in generating self-portraits and exchanging them with one other. Therefore, the present invention is to provide a more amusing play device in which a high level information can be electronically exchanged, so that the exchanged self-portrait are printed at any desired terminals. Conventionally, only persons having a personal computer are able to acquire self-portraits and other information which are registered on home pages through the Internet. However, according to the present invention, since a terminal of a play device for generating a synthesized self-portrait is connected to a home page through the Internet, players can have access to self-portraits and other information without using a personal computer.

For example, when an ID code determined in the previous printing process is known to each other between the players, the player's ID code or the other players' ID code is inputted into the terminals of the play device for generating a synthesized self-portrait. The self-portrait of the player or the self-portraits of the other players are thus shown on an information display device (for example, CRT), so that it is printed on seals as desired.

Although it does not belong to the technical field of the play device for generating a synthesized self-portrait, Japanese Patent Unexamined Publication No. Hei. 8-280934 discloses a system terminal of a common game system connected to a host computer through the public telephone line. Using this system, a game program can be renewed by the latest one.

Also, Japanese Patent Unexamined Publication No. Hei. 5-233308 discloses a POS terminal connected to a host computer through a communication line in the POS system. A program can be downloaded from the host computer by a remote control in accordance with a system program provided on the POS terminal side whenever a version of the program is upgraded.

SUMMARY OF THE INVENTION

Accordingly, the present invention is directed to a play device for generating a synthesized self-portrait that substantially obviates one or more of the problems due to the limitations and disadvantages of the related art.

An object of the present invention to provide a play device for generating a synthesized self-portrait which can transmitted as an electronically exchanged self-portrait through the Internet.

Additional features and advantages of the present invention will be set forth in the description which follows, and will be apparent from the description, or may be learned by practice of the invention. The objectives and other advantages of the invention will be realized and attained by the structure and process particularly pointed out in the written description as well as in the appended claims.

To achieve these and other advantages and in accordance with the purpose of the present invention, as embodied and broadly described, there is provided a play device for generating a synthesized self-portrait which includes a photographed image of a player and frame. The device includes a terminal for displaying and printing the synthesized self-portrait, a network server for providing the self-portrait data of each player assigned to ID code data at designated terminals, a management device for managing the play device, and a monitoring system for monitoring various operation conditions of the play device.

In another aspect of the present invention, a terminal of a play device for generating a synthesized self-portrait having a photographed image of a player and a frame image includes a play type selecting switch for selecting a type of play, an ID code inputting unit for inputting an ID code assigned to each player, a communication network access allowing access to a server that includes self-portrait data of each player, and a downloader for downloading the self-portrait data from the server that includes the ID code and self-portrait data corresponding to the ID code.

In an another aspect of the present invention, a terminal of a play device for generating a synthesized self-portrait which includes a photographed image of a player and a frame image, includes a play type selecting switch for selecting a type of play, an ID code setting unit for generating ID code data when the play type selecting switch selects the play type registered in a home page of a server, and a signal connector for connecting the ID code data with the self-portrait data corresponding to the ID code, wherein the ID code data and the self-portrait data corresponding to the ID code data are transmitted to the server when the play type selecting switch selects the type of play registered in the home page.

In a further aspect of the present invention, a server of a play device for generating a synthesized self-portrait includes a memory storage device for accommodating ID code data and self-portrait data corresponding to the ID code data sent from a plurality of terminals of play devices for generating synthesized self-portraits through a communication network, and a download permission unit for permitting each designated terminal to download self-portrait data from the memory storage device through the communication network.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention that together with the description serve to explain the principles of the invention.

In the drawings.

DESCRIPTION OF THE PREFERRED EMBODIMENT

Reference will now be made in detail to the preferred embodiments of the present invention, examples of which are illustrated in the accompanying drawings.

Figure 1:
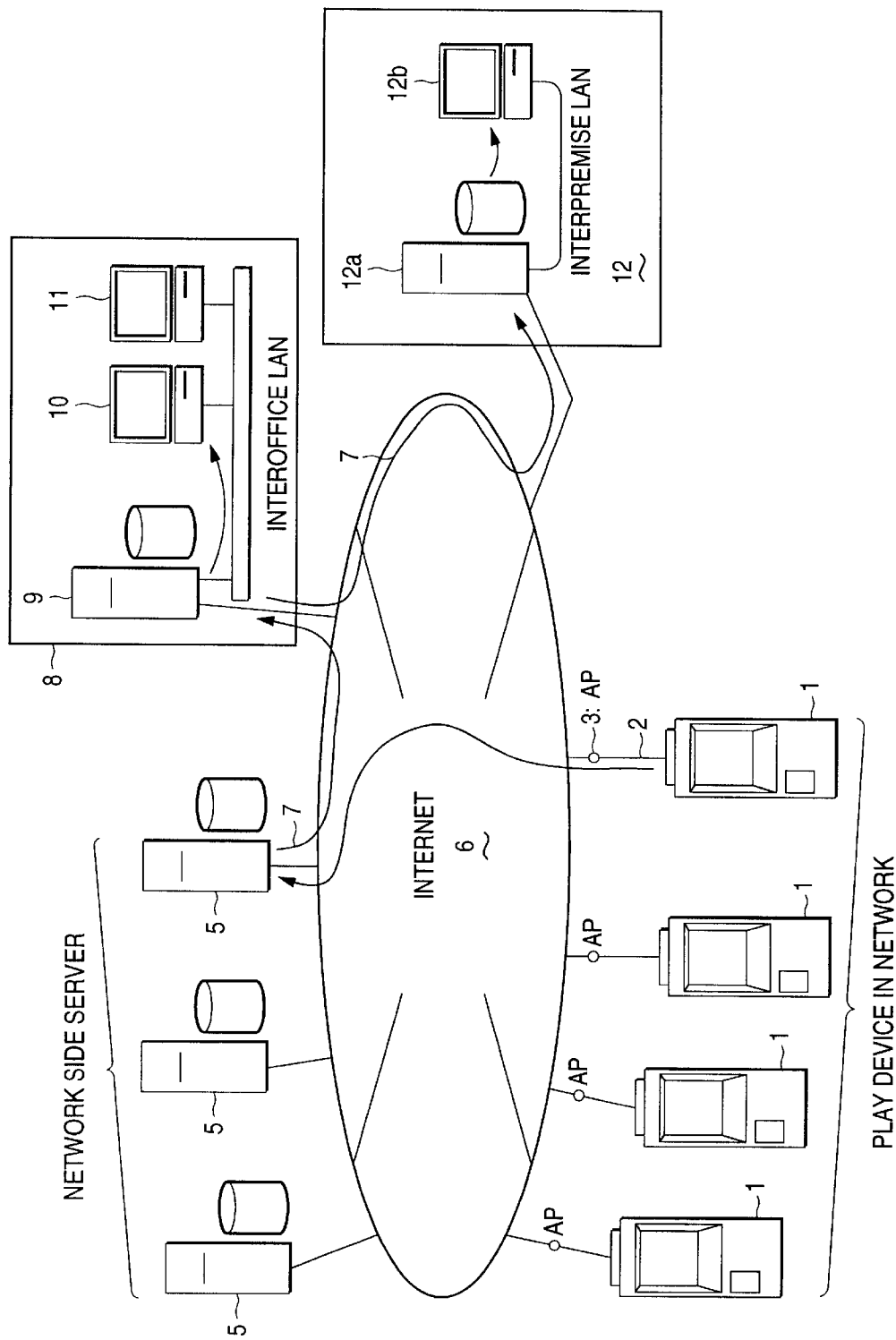
FIG. 1 is a schematic view of the overall system of a play device for generating a synthesized self-portrait of the present invention.

FIG. 1 is a schematic view of the overall system of the play device for making a synthesized self-portrait of an embodiment of the present invention. A terminal 1 of the play device for generating a synthesized self-portrait begins to operate when a coin is put into the play device. In order to generate a synthesized self-portrait in the play device, a desired image has to be first photographed by a player. A frame image designated by the player is then synthesized with the photographed image to form a self-portrait. Thereafter, the self-portrait is shown on the display device and is printed on the seal. There are two different play functions using the play device for generating a synthesized self-portrait. One play function is that the self-portrait is printed on a seal so that the printed seal can be provided to the player. Another play function is that a home page is generated in accordance with data contained in the self-portrait and further the home page is registered and is printed on a seal. In this specification, the former is referred to as "stand-alone type play", and the latter is referred to as "network type play".

Each terminal 1 is connected to the Internet 6 via an access point (AP) by a digital telephone line 2 (for example, ISDN). A network server 5 for opening the home page to the public is connected to the Internet 6.

A management device 8 including a management server 9 and a management computer 10 is connected to the Internet 6 via an exclusive line 7. A business data processing computer 11 is connected to the Internet 6 via the interoffice LAN.

The terminal 1 of the play device for generating a synthesized self-portrait adds self-portrait data, such as image data, voice data and text data, to the management data. The self-portrait data is then transmitted to the network server 5 through the digital telephone line 2. The network server 5 separates the management data from the self-portrait data, and transmits a group of management data to the management server 9 and the business data processing computer 11 through the exclusive line 7.

The management computer 10 conducts and monitors management of sales, the frequency of utilization of the terminal, the frequency of utilization of the frame image, and the amount of money stored in the play device. The business data processing computer 11 conducts managements of collection of money and the bill. The management device 8 is connected to a customer monitoring system 12 through another exclusive line 7. The customer monitoring system 12 includes an Internet receiving server 12a and a monitoring computer 12b. The Internet receiving server 12a and the monitoring computer 12b are connected to each other by the interoffice LAN. The customer monitoring system 12 displays information reflecting whether all sheets of paper have been used up, as well as various operating conditions.

Figure 2:
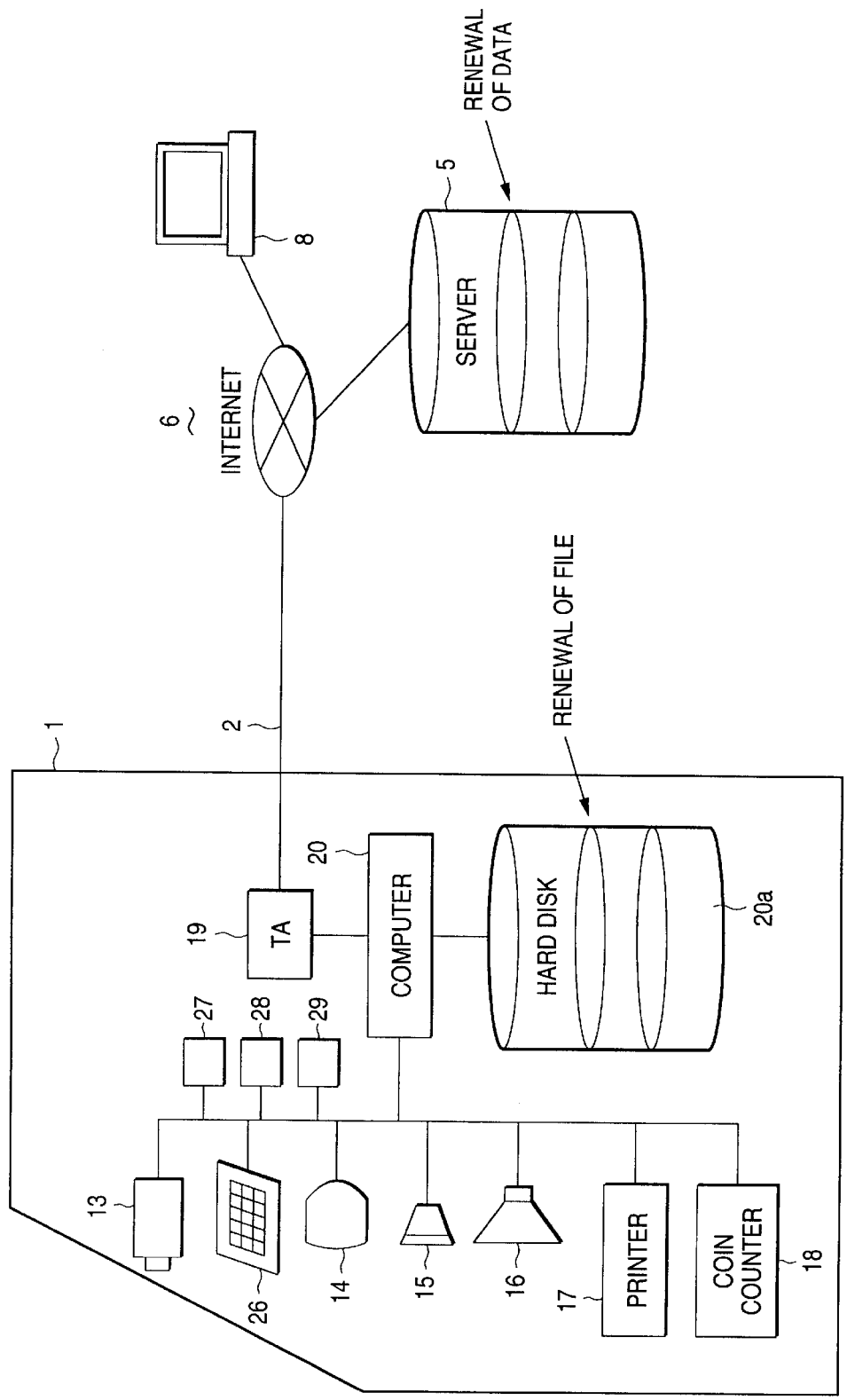
FIG. 2 is a block diagram showing an arrangement of the periphery of a terminal of the play device for making a synthesized self-portrait shown in FIG. 1.

FIG. 2 is a block diagram showing the arrangement of the terminal 1 of the play device for generating a synthesized self-portrait in detail. The terminal 1 of the play device for generating a synthesized self-portrait includes a computer 20 for controlling the play function of the play device. The computer 20 includes a data storage 20a such as a hard disk, which accommodates a control program and a file containing a plurality of types of frame image data to be used as a background image.

The computer 20 is connected to: a camera 13 for photographing a desired object by a player; a CRT 14 for displaying a self-portrait including a photographed object, frame image data designated by the player, and character information; a microphone 15 for inputting voices; a speaker 16 for outputting voices; a printer 17 for conducting color-printing of the synthesized self-portrait on a seal; a coin counter 18 for sorting and counting the amount of money in the device; a key board 26 for inputting character and numeral information by the player, and also for selecting a frame image and for inputting an ID code; and a selecting switch 27, an ID code set unit 28; and a signal connector means 29. Instead of the key board 26, characters and numerals may be inputted by a touch panel arranged on the CRT 14.

In the above embodiment, the selecting switch 27 is for selecting a play type by a player. Thus, the player can select any of the following types of play using the selecting switch 27. The player can select "seal play" in which the player prints his self-portrait on a seal. Also, the player can select "home page making play" in which a home page is generated in the server through the Internet and his self-portrait and voice are registered on the home page. The player can further select "home page browsing and seal printing play" in which the player browses his own home page or the other player's home pages by inputting the ID code into the key board 26, thereby printing the obtained self-portrait.

The computer 20 controls a necessary circuit by the control program in accordance with the selection conducted by the selecting switch 27 and the input conducted through the key board 26.

The terminal 1 has both the stand-alone type play function and the network type play function. The camera 13, CRT 14, printer 17, key board 26 and play type selecting switch 27 are used for both functions described above. That is, a self-portrait to be printed on a seal is generated according to a desired object (the upper half of the body of the player in many cases) photographed by the camera 13 as well as the frame image data and the character data inputted by the player with the key board 26.

When the network type play such as generation of home page is selected by the play type selecting switch 27, voice information may be inputted with the microphone 15. At the same time, an ID code is set by the ID code setting unit 28. The ID code and the self-portrait data corresponding to the ID code are connected with each other by the signal connector 29. Therefore, the ID code and the self-portrait data corresponding to the ID code are transmitted to the network side server 5 through the terminal adapter (TA) 19, the communication line 2 including the digital telephone line, and the Internet 6, and stored in the memory storage device in the server 5.

According to the selection conducted by the play type selecting switch 27, the self-portrait data for the home page is read out from the memory storage device in the network server 5 through the Internet or the telephone line. The self-portrait for the home page is then printed on a seal by the printer 17.

In this specification, a device having a portion or all of the functions of the server 5 arranged in the network and the management server 9 is referred to as a server.

In order to transmit data, an individual number (ID of the terminal) necessary for communication is allotted to each terminal 1. The individual number is different from the ID of the Internet 6. In other words, the individual number represents "a place at which the terminal is installed and a function of the terminal", which is necessary for managing the play device. In this system, the individual number is referred to as "terminal ID", which is previously registered in the management server 9 and the management computer 10.

In "home page making play," the self-portrait and voice are registered through the Internet. In "home page browsing and seal printing play," the self-portrait of the player or the self-portraits of the other players are browsed and printed by inputting an ID code with the key board 26. Therefore, self-portrait data including image data, voice data, character data and ID code data are transmitted and received between the terminal 1 and the network server 5 whenever it is requested by the player. In "home page making play," after ID code data, self-portrait data, and voice data are transmitted from the terminal 1 to the server 5, they are stored in the memory storage device arranged in the server 5.

In case of "home page browsing and seal printing play", the operation is conducted as follows. When an index file on the server 5 is opened, it is confirmed whether or not data corresponding to an ID code transmitted from the terminal 1 is accommodated. When the ID code transmitted from the terminal 1 is accommodated in the index file, a download permission unit permits the terminal 1 to download a desired self-portrait data. After the desired self-portrait is transmitted from the server 5 to the terminal 1 with the ID code, the transmitted self-portrait is displayed on the information display device and is printed on a seal as desired.

Figure 3:
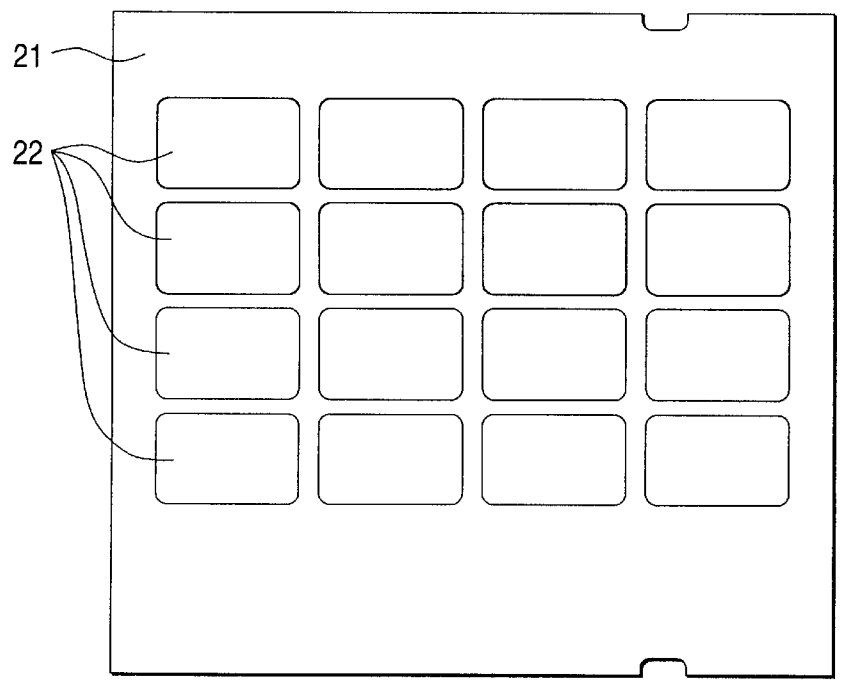
FIG. 3A illustrates a printed seal in a stand-alone type play device.
FIG. 3B illustrates a printed seal in a network type play device.
Figure 3:
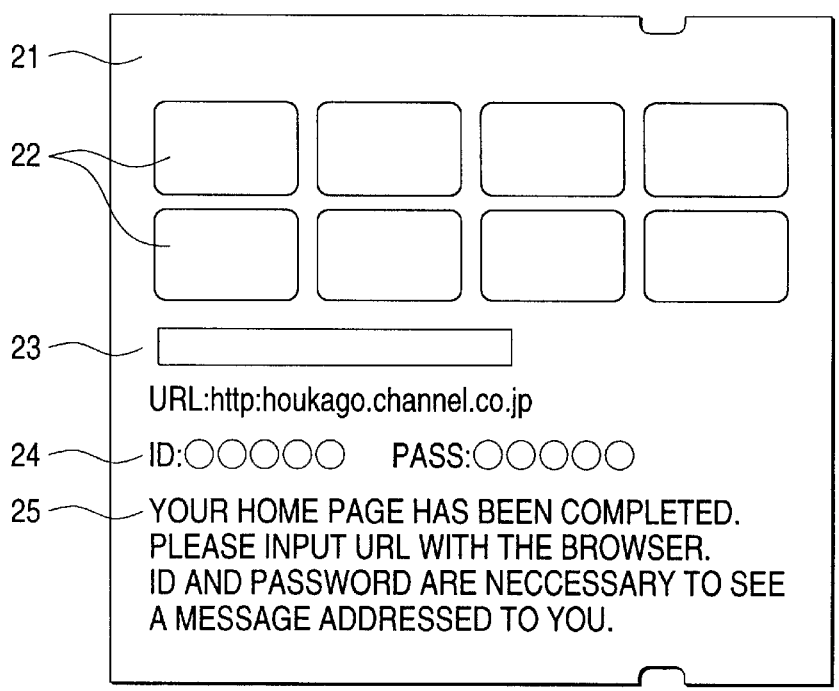

FIGS. 3A and 3B illustrate examples of printed seals in the stand-alone type play and the network type play, respectively. A sheet of paper for the seal 21 may be used for both the seal play and a home page making play. Since information on the number of sheets remaining in the terminal is monitored as described earlier, sheets of paper can be continuously supplied in the present invention. The number of pieces of seals 22 in the home page making play is smaller than that of the seal play. Additionally, a message 23 inputted by the player, an address of the home page, ID number, password 24, and comment 25 can be recorded on the margin of the sheet 21.

The printed ID code is not an address (URL) of the home page of the Internet but an eight-digit number. In, the first four digits of the eight-digit number are an original code of the terminal allotted to the terminal 1 by the terminal manager, and the rest of the four digits are a serial number which increases one by one whenever the network type play is executed by the player. Such an eight-digit number is set by the ID code setting unit 28 arranged in the terminal 1.

Figure 4:
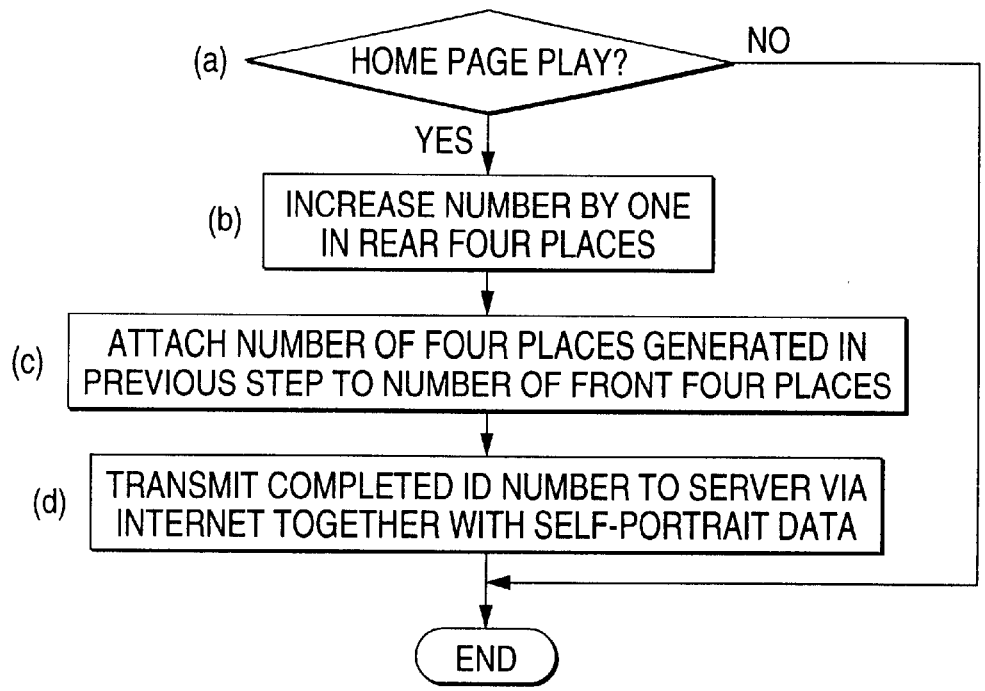
FIG. 4 is a flow chart showing a generation of an ID code and a transmitting operation of self-portrait data corresponding to the ID code to a server.

Referring to FIG. 4, a generation of ID code of the play device in the present invention will be explained as follows. In step (a), it is detected whether or not it is a home page play. The program proceeds to step (b) when it is determined as the home page play, and one of the last four digits is increased by one. Next, in step (c), the last four-digit numbers generated in step (b) is attached to the original first four-digit number in the terminal 1. Further, by the eight-digit number ID code generated in step (c), image data and voice data by the signal connector 29 is connected and transmitted to the server 5 through the Internet 6 in step (d).

When the network type play is selected by the play type selector 27 as described above, the terminal 1 is connected to the Internet 6 through the communication line 2. Since the URL is previously set in the terminal 1, the terminal 1 can be connected to the home page in the Internet. When the self-portrait is printed on a seal in the terminal 1, the ID code is written on the printed seal. At the same time, the ID code and the self-portrait data are accommodated in the memory storage device arranged in the network server 5.

Figure 5:
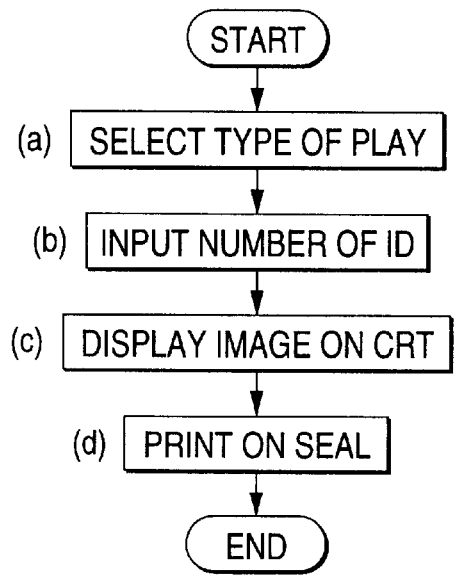
FIG. 5 is a flow chart showing an operation of the play device for generating a synthesized self-portrait.

Next, referring to FIG. 5, operation of the network type play will be explained when a player knows his ID code or an ID code of the others and plays at the terminal 1. In step (a), the network type play is selected by the play type selector 27. Next, in step (b), for example, an ID code of the other player is inputted into the terminal 1 with the key board 26. The terminal 1 is then connected to the Internet 6 through the communication line 2. The terminal 1 is thus connected to the home page in the Internet, and the download permission unit of the server 5 begins to operate. Therefore, the self-portrait data and voice data accommodated in the memory storage device of the server 5 are downloaded to the designated terminal. Accordingly, the designated self-portrait data is read out from the memory storage device of the server 5. In step (c), the read self-portrait is displayed on the display device 14 of the terminal 1. The displayed self-portrait of the other player can be printed on a seal in step (d) as desired.

When the self-portrait data accommodated in the memory storage device of the server 5 may be saved for a selected period of time, for example, ten days. Alternatively, the period may be determined later in accordance with the management data showing operation conditions of the terminal that is transmitted from the terminals of the play device for making a synthesized self-portrait to the management device.

As described above, the terminal 1 may be used in the same manner as that of a personal computer connected to a specific home page in the Internet. Accordingly, the players enjoy this type of play in the play device for generating a synthesized self-portrait in the present invention whenever the ID code is inputted to the terminal 1.

In addition, since the self-portrait data are electronically exchanged between the players through the communication line, the terminal of the play device is more effectively utilized than that of the conventional terminal, thereby entertaining the player more.

The present invention is not limited to the above specific embodiment, and various modifications can be made. For example, the terminal 1 of the play device may perform both the standalone type play and the network type play. Further, the communication network is not limited to the Internet, but an exclusive line may be used as an alternative.

It will be apparent to those skilled in the art that various modifications and variations can be made in the play device for generating synthesized self-portrait of the present invention without departing from the spirit or scope of the invention. Thus, it is intended that the present invention cover the modifications and variations of this invention provided they come within scope of the appended claims and their equivalents.

What is claimed is:

1. A terminal of a play device for generating a synthesized self-portrait which includes a photographed image of a player and a frame image, the terminal comprising:

a play type selecting switch for selecting a type of play;

an ID code setting unit for generating ID code data when the play type selecting switch selects the play type registered in a home page of a server; and a signal connector for connecting the ID code data with a self-portrait data corresponding to the ID code, wherein the ID code data and the self-portrait data corresponding to the ID code data are transmitted to the server and stored in the server when the play type selecting switch selects the type of play registered in the home page.

2. The terminal according to claim 1, further comprising a display device for displaying the self-portrait data corresponding to the ID code.

3. The terminal according to claim 1, further comprising a video printer for printing the self-portrait data on a sheet.

4. A play device for generating a synthesized self-portrait which includes a photographed image of a player and frame, the device comprising:

a terminal for displaying and printing the synthesized self-portrait;

a network server for providing a self-portrait data of each player assigned to ID code data at designated terminals;

a management device for managing the play device including a management server; and a monitoring system for monitoring various operation conditions of the play device including an Internet receiving server.

5. The play device according to claim 4, wherein the network server separates a management data from the self-portrait data and transmits a group of the management data to the management server.

* * * * *